Aug. 15, 1950 — W. A. CANNELL ET AL — 2,518,447
WELDING ELECTRODE
Filed Oct. 23, 1948 — 2 Sheets-Sheet 1
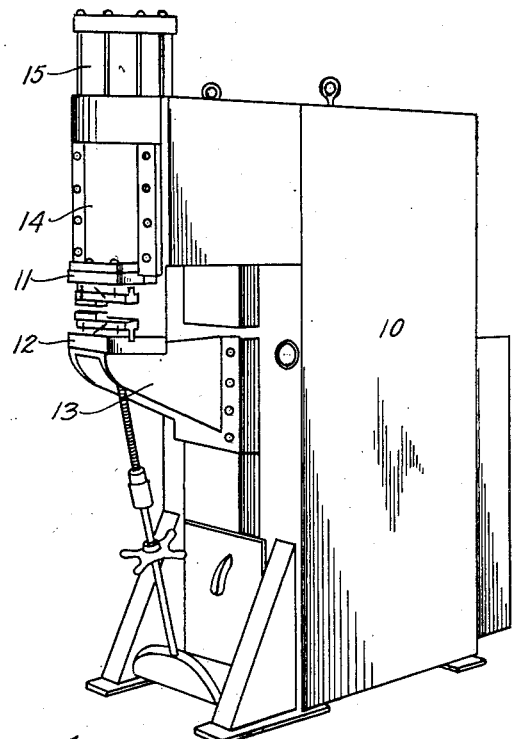
Fig.-1
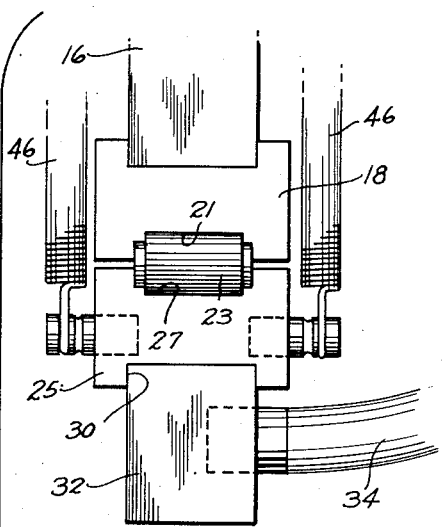
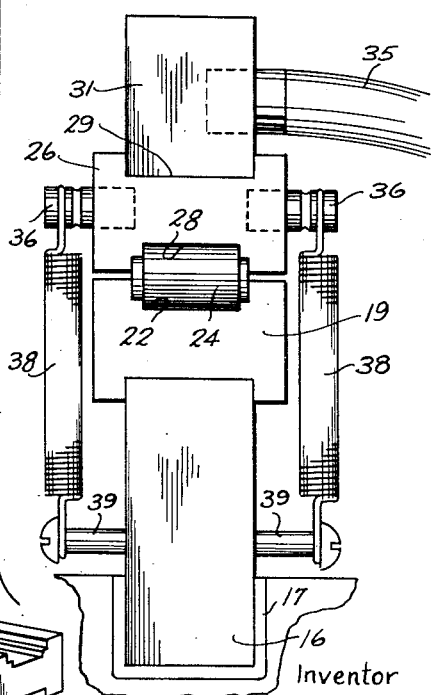
Fig.-2
Fig.-3
Inventor
William A. Cannell
Maurice D. Woodruff
Tom Walker
Attorney

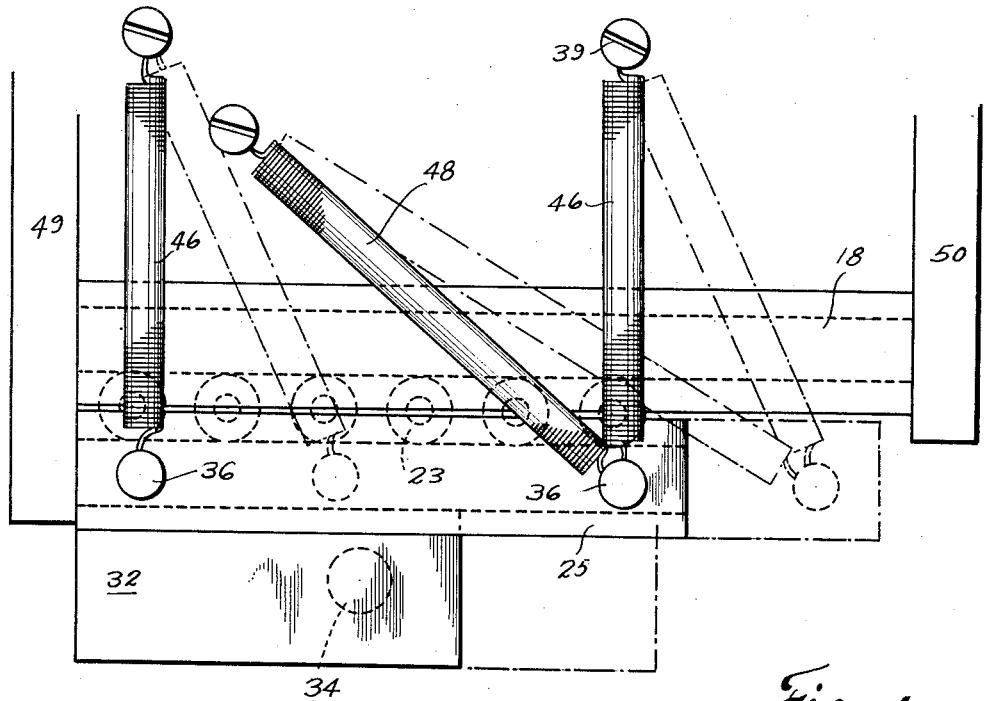
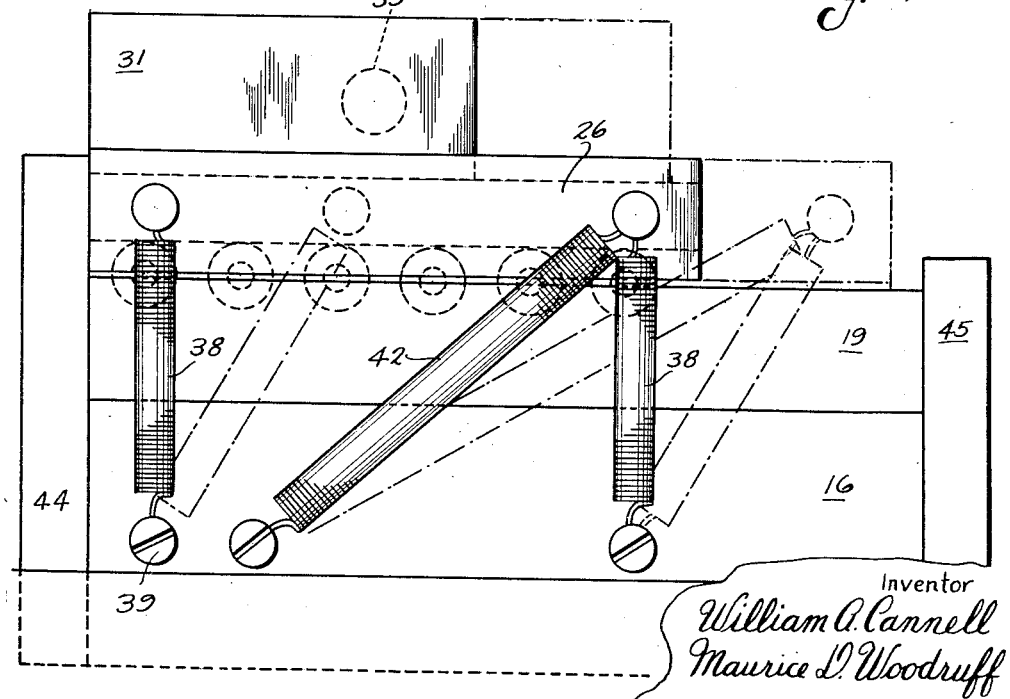

Patented Aug. 15, 1950

2,518,447

UNITED STATES PATENT OFFICE 2,518,447

WELDING ELECTRODE

William A. Cannell and Maurice D. Woodruff, Springfield, Ohio, assignors to The Bauer Bros. Company, Springfield, Ohio, a corporation of Ohio Application October 23, 1948, Serial No. 56,082

17 Claims. (Cl. 219—4)

This invention relates to welding apparatus, and more particularly to welding machines for operation upon continuously moving work.

The problem of welding material in motion by a relatively stationary machine is one which has not heretofore practicably been solved. The making of a weld involves the application of initial pressure to the work, the development of a melting heat while the work is under pressure and continuance of the pressure upon the work for an interval of time after the application of heat to set the weld. It not being apparent how this three-phase operation could be carried out upon material in motion by a conventional reciprocating jaw machine, past design effort has been directed to rotary principles of operation wherein arcuate shaped or rotary electrodes press upon and turn with the work. Results with this type of apparatus are often inconsistent, however, due to the high degree of precision required, and the difficulty in presenting an adequate electrode area for the simultaneous forming of spaced welds. The greatest utility of the rotary machines is in continuous seam welding. Moreover, circular or arcuate electrodes are costly to manufacture and to maintain.

The present invention utilizes a reciprocating jaw type welding machine for operation upon continuously moving work, thereby obviating the difficulties encountered with rotary machines and permitting the use of the cheaper and more satisfactory conventional flat electrodes.

The object of the invention is to simplify the construction as well as the means and mode of operation of automatic continuous welding equipment, whereby such machines may not only be economically manufactured, but will be more efficient and accurate in use, adaptable to a wide variety of work, having relatively few moving parts and be unlikely to get out of repair.

A further object of the invention is to provide a welding machine capable of continuously welding a traveling work piece by means of reciprocating electrodes.

A further object of the invention is to provide a welding machine in which multiple welds are produced upon the work piece while such work piece is continuously moving through said machine.

A further object of the invention is to provide a welding machine in which the electrodes are moved by the traveling work piece and automatically returned to normal position upon release from the traveling work piece.

A further object of the invention is to provide a machine possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

In carrying out such objects there has been provided a welding machine assembly in which the electrodes, through which pressure of the jaws is applied to the work, are yieldingly connected to the jaws for transverse movement relative thereto. Accordingly, when frictionally engaged with the work the electrodes travel therewith, tracks of sufficient length being provided in the jaws to permit a continued motion of the electrodes under pressure throughout the welding cycle. At the end of the cycle the jaws open, releasing the electrodes for return to their normal or starting position under the influence of a resilient connection between the jaws and the electrodes.

Referring to the accompanying drawings, wherein is found the preferred but obviously not necessarily the only form of embodiment of the invention, Fig. 1 is a perspective view of a welding machine in accordance with the present invention;

Fig. 2 is a detail view in vertical cross section through the electrode assemblies;

Fig. 3 is a detail view in perspective of one of the electrode assemblies; and

Fig. 4 is a view in side elevation of the electrode assemblies.

Like parts are indicated by similar characters of reference throughout the several views.

Referring to the drawings, there is shown in Fig. 1 a welding machine 10 of the reciprocating head type constructed and arranged for operation upon a continuously moving work in accordance with the instant invention. The illustrated machine is for a stationary installation, the work to be welded being progressively fed to the machine which is so constructed as to produce repeated welding cycles each involving the time application of heat and pressure to successive portions of the work. There is included in the machine a number of elements characteristic of welding apparatus, such as a transformer, timing and speed controls and the like which it is not necessary here to consider. Also, it will be understood that there is associated with the machine conveyor means for advancing the work, suitably positioned, to and from cooperative relation with the welding electrodes.

The head of the machine is indicated at 11 and the platen at 12, the head and platen defining opposed jaws between which the work to be welded is passed. The platen 12 is shaped as a flat block and is mounted on a forwardly extending arm 13 secured to the frame of the machine. The head 11 is similarly shaped and overlies the platen 12, being attached to the bottom of a ram 14 vertically reciprocable under the influence of air pressure supplied to a cylinder 15.

In the adjacent or outer surfaces of the head 11 and platen 12 are transverse grooves respectively receiving rectangular spacer members 16. The spacers 16 have a press fit or are otherwise secured in their respective mountings and preferably are shielded from direct contact with the head and platen members by suitable insulation 17. In overlying relation to each spacer 16, which stand on edge in the head and platen members, are bars 18 and 19 also rectangular in shape and formed with a longitudinal groove on the underside thereof receiving the outer edge of an associated spacer 16. The bars 18 and 19 are made fast relative to the spacer members 16 and so are fixed with respect to the head 11 and platen 12. The under surface of the bar 18 and the upper surface of the bar 19 are longitudinally recessed in a stepped formation to define respective raceways 21 and 22 for sets of roller bearings 23 and 24.

The bearings 23 and 24 project out of their respective raceways in the bars 18 and 19 and provide a mounting for rectangular electrode supports 25 and 26 underlying and overlying respective bars 18 and 19. The top side of the support 25 and the underside of support 26 are formed with longitudinal raceways 27 and 28 complementary to the raceways 21 and 22 and receiving the projecting portions of the respective bearings 23 and 24. The supports 25 and 26 are accordingly prevented from moving laterally with respect to the bars 18 and 19, but are permitted to slide longitudinally thereof upon the roller bearings 23 and 24.

The upper surface of the support 26 is formed with a longitudinal groove 29 receiving therein with a press fit an electrode 31, while the support 25 is formed with a corresponding groove 30 receiving a similar electrode 32. The electrodes 31 and 32, preferably of copper, are bar shaped and of a length predetermined in accordance with the area of the work to be acted upon during each welding cycle. Connected to the electrodes 31 and 32 are the terminals of electrical conductors 34 and 35 through which welding current is supplied to the electrodes from the transformer, the conductors being flexible so as to follow the reciprocatory motion of the electrodes.

The electrode supports 25 and 26 and, therefore the electrodes 31 and 32 are yieldingly attached to the head 11 and platen 12, respectively. The support 26 has two sets of longitudinally spaced screw studs 36 and 37 on the opposite sides thereof to which are attached tension springs 38. The opposite ends of the springs 38 are similarly attached to screw studs 39 and 41 set in the spacer block 16. A further set of springs 42 is connected to the studs 37 in support 26, the opposite ends thereof being secured to screw studs 43 in the block 16 adjacent the studs 39. The springs 38 retain the support 26 in contact with the rollers 24 and tend to define a normal position for the support in which the studs 36 and 37 are vertically aligned with the studs 39 and 41 respectively. The springs 42 occupy an inclined position relative to the longitudinal axis of the support 26 and so exert a force thereon tending to move the support in a leftward direction as viewed in Figs. 1, 3 and 4. Motion of the support in such direction is limited by a plate 44 fastened to one end of the bar 19 and insulated from the platen 12. A similar plate 45 at the opposite end of the bar 19 limits motion of the electrode support 26 in the opposite or rightward direction.

There is associated with the head assembly corresponding sets of springs 46 and 48 operating in the same manner and for the same purpose upon the electrode support 25. Stop plates 49 and 50 limit the motion of the support 25 in the same manner that the plates 44 and 45 limit movement of the support 26.

The construction and arrangement of the mountings for the electrodes 31 and 32 accordingly is such as to place these elements in opposed aligned relation substantially as shown in the drawings. In the retracted or elevated position of the head 11, the electrodes are spaced apart a distance permitting freedom of movement of the work therebetween.

In the operation of the machine the motion of the work is in a right-hand direction as viewed in Fig. 4 or in a direction contrary to the forces developed by the springs 42 and 48. The work continuously passes through the jaws of the machine and continuously presents successive portions thereof in position to be acted upon by the electrodes 31 and 32. Each welding cycle is begun by a descent of the head 11 toward the platen 12. In the course of such movement the electrode 32 engages the upper side of the work and presses it down upon the electrode 31 which thus engages the underside of the work. Downward motion of the head continues until the electrodes exert a clamping pressure upon the work, which pressure is maintained for a predetermined time interval during which the weld is made and set. During the application of such pressure the work continues to advance relative to the machine, which travel motion is transmitted to the electrodes 31 and 32 by reason of their frictional engagement with the work and by reason of the sliding motion of their supports on the roller bearings 23 and 24. The longitudinal movement of the electrodes is accomplished against the yielding resistance of the springs 42 and 48 which are stretched thereby. At the end of the welding cycle, which is marked by elevation of the head 11, the clamping pressure exerted by the electrodes is released and they are retracted to their normal or starting position by the springs 42 and 48, such action being aided by the springs 38 and 46 which are tensioned by the offsetting of their terminal anchor studs. In returning to starting position, the electrodes assume a cooperative relation to the next portion of the work and act thereon in the manner above described when the head 11 descends to begin the next welding cycle. The timing cycle of the machine may be such that the reciprocatory motion of the electrodes is continuous, the succeeding cycle being initiated immediately upon completion of the receding cycle.

As disclosed, the machine has a variety of applications to various types of welding work, and its utility may be increased by changing the size and shape of the electrodes by modifying the speed of operation and by other changes within the scope and principles of construction and operation herein presented. A particular application lies in the joining of longitudinally spaced, transversely extending metal wires to a traveling frame wire to produce, for example, a refrigerator tray. In such example, two machines of the type shown herein are used, one on each side of the tray to be made. The traveling frame wires are passed continuously through the two machines with the metal cross wires in place thereon. On the downward stroke of the head 11 approximately four of the cross wires are clamped between the electrodes 31 and 32, the lower electrodes engaging the frame and the upper electrode pressing the cross wires down upon the frame. This constitutes the initial operation of the welding cycle. As the work advances, carrying the electrodes with it, welding current generated by the machine causes a localized mingling of the metals of the cross wires and frame wires. After a momentary application of the welding current to the electrodes, the current supply is discontinued, but the pressure upon the work is maintained for an interval while the welds cool and set. When the head 11 thereafter rises, the electrodes are released for return to starting position where they may be clamped upon the next series of four cross wires and repeat the above cycle.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described our invention, we claim:

1. An automatic electric welding machine having a pair of relatively reciprocable members between which work to be welded is continuously advanced, including a sliding electrode support upon each of said members, resilient means maintaining said supports in engagement with said members against the yielding resistance of which the supports are movable relative to said members in a plane parallel therewith, and under influence of which said supports are returned to their normal position, an electrode fixed upon each of said supports, and flexible electrical conductors interconnecting each electrode with a source of electrical power, the construction and arrangement being such that upon relative movement of the members toward each other the electrodes are brought into engagement with the continuously traveling work for unison advancement therewith during which time the welding operation is completed.

2. A welding machine for operation upon a continuously moving work piece, including a platen over which the work to be welded passes, a head vertically reciprocable with respect to said platen, electrodes mounted on said head and on said platen for transverse motion relative thereto in planes parallel to the movement of the work and applying a clamping pressure to the work in response to motion of said head toward said platen and moving with the work because of and during the application of the clamping pressure, and resilient means for restoring said electrodes to a starting position during motion of said head away from said platen.

3. A welding machine for operation upon a continuously moving work piece, including relative reciprocable head and platen members, transversely movable electrodes pressed by an approaching motion of said head and platen members into clamping engagement with the work and traveling with the work because of and during such clamping engagement, elongated slideways on said members for said electrodes, and yielding means urging said electrodes to a normal or starting position in said slideways.

4. A welding machine for operation upon a continuously moving work piece, including a platen, a head defining with said platen jaws between which the work to be welded passes, said head and said platen being relatively movable as a part of repeated cycles of operation during each of which a clamping pressure is applied to the work for a predetermined period of time, opposed electrodes on said head and said platen movable therewith and further movable relatively thereto in a direction parallel to the direction of motion of the work, said electrodes contacting the work in response to the application of clamping pressure between said head and said platen and being advanced by said work in company therewith during the period of application of the clamping pressure, and yielding means defining a starting position for said electrodes and retracting said electrodes to said starting position at the end of the period of application of the clamping pressure.

5. A welding machine for operation upon a continuously moving work piece, including a platen, a head defining with said platen jaws between which the work to be welded passes, said head moving toward said platen to apply a clamping pressure to the work at the start of each welding cycle and moving away from said platen to release the work at the end of each welding cycle, electrically energizable electrodes arranged on the opposing jaws of said head and said platen, the clamping pressure being applied to the work through said electrodes, a reciprocatory mounting for each electrode permitting advancement thereof by and with the work relatively to said head and said platen during application of the clamping pressure, yielding means for retracting said electrodes at the end of each welding cycle, and flexible electrical conduits connected to said electrodes.

6. A welding machine for operation upon a continuously moving work piece, including a platen, a head defining with said platen jaws between which the work to be welded passes, said jaws being relatively movable to apply a clamping pressure to the work during each welding cycle, traveling electrodes in said jaws engageable with the work and movable therewith during application of the clamping pressure, and resilient locating means defining a normal position for said electrodes and returning said electrodes to said normal position at the end of each welding cycle.

7. A welding machine according to claim 6, characterized by flexible electrical conductors connected to said electrodes to permit the energizing thereof during the traveling motion of said electrodes.

8. A welding machine for operation upon a continuously moving work piece, including relatively reciprocable head and platen members between which the work passes, longitudinal slideways in said members, electrode bars reciprocable in said slideways relatively to said members and movable by said members into clamping engagement with the work, said electrodes being moved by the work transversely in said slideways during such clamping engagement, spring return means for restoring said electrodes to a starting position in said slideways at the end of such clamping engagement, and flexible electrical conduits connected to said electrodes for the energizing thereof during a selected portion of their travel with the work.

9. A welding machine for operation upon a continuously moving work piece, including relatively reciprocable head and platen members between which the work passes, longitudinal slideways in said members, electrode bars reciprocable in said slideways relatively to said members and movable by said members into clamping engagement with the work, said electrodes being longitudinally moved in the slideways by the work during such clamping engagement, spring means retaining said electrodes in said slideways, and additional spring means for restoring said electrodes to a starting position in said slideways when said electrodes are released from a clamping engagement with the work.

10. A welding machine for operation upon a continuously moving work piece, including relatively reciprocable head and platen members defining opposed jaws between which the work passes, said jaws closing and opening upon the work repeatedly to carry out successive welding cycles, a longitudinal slideway in the opposing jaws of said head and said platen, roller bearings in said slideways, an electrode support associated with each said jaw and mounted on said bearings for reciprocating sliding movement, an electrode on each said support and fixed relative thereto, said electrodes engaging opposite sides of the work piece in response to closing motion of said jaws and advancing with said work while said jaws remain closed, and means for returning said electrodes from advanced position during opening motion of said jaws.

11. A welding machine for operating upon a continuously moving work piece, including relatively reciprocable head and platen members defining opposed jaws between which the work passes, said jaws closing and opening upon the work repeatedly to carry out successive welding cycles, a longitudinal slideway in the opposing jaws of each said head and said platen, an electrode support mounted on each said slideway for reciprocatory motion therealong, spring means holding said supports upon said slideways, an electrode upon each said support and fixed relatively thereto, said electrodes engaging opposite sides of the work in response to closing motion of said jaws and advancing with the work while said jaws remain closed, and additional spring means for retracting said electrodes and electrode supports during opening motion of said jaws.

12. In a welding machine for operating upon a continuously moving work piece, relatively reciprocable head and platen members defining opposed jaws between which the work passes, said jaws acting in each welding cycle to close upon the work for a predetermined time interval and then to open for a repeated operation upon a following section of the work, electrodes carried in said opposing jaws for opening and closing motion therewith and for longitudinal movement relative thereto, said electrodes frictionally engaging the work and advancing therewith during the time interval in which said jaws are closed, resilient means for retracting said electrodes when said jaws open, and flexible electrical conduits connected to said electrodes for the energization thereof.

13. An automatic electric welding machine having a pair of relatively movable members between which work to be welded is continuously advanced, including an electrode adjustably mounted upon each of said members for reciprocatory motion relative thereto enabling movement of the electrodes in unison with the work advancing therethrough upon movement of the members toward each other to bring the electrodes into clamping engagement therewith, and resilient retaining means maintaining the electrodes in engagement with the members against the yielding resistance of which the electrodes are moved in one direction and under the retractive influence of which the electrodes are returned to their original position upon release of the electrodes from engagement with the traveling work.

14. In an electric welding machine having a pair of platens movable toward and from each other, a traveling electrode carried by each of said platens for unison movement therewith toward and from each other, each of said electrodes being capable of further reciprocatory travel movement relative to said platens in response to frictional contact with a traveling work piece, and means for supplying welding current to said electrodes in any position of adjustment.

15. A welding machine for operation upon a continuously moving work piece, including a pair of relatively reciprocable members between which the work to be welded moves in a plane perpendicular to the plane of motion of said members, electrodes mounted on the adjacent faces of said members for transverse sliding movement relative thereto in planes parallel to the plane of movement of the work, said electrodes engaging the work and being moved thereby with the work in response to an approaching motion of said members, and means for restoring said electrodes to a transverse starting position in response to a separating motion of said members.

16. A welding machine for operation upon a continuously moving work piece, including opposed electrode bars to receive the work therebetween, slideways elongated with respect to said electrode bars supporting said electrode bars for motion parallel to the plane of movement of the work, means for effecting timed approaching and separating motions of said slideways to clamp said electrode bars upon the work, to maintain the clamping pressure for a predetermined interval and then to release such pressure, said electrode bars traveling with the work in said slideways during the application of such clamping pressure by reason of frictional engagement therewith, restoring means for said electrode bars effective during the separating motion of said slideways, and flexible electrical conductors connected to said electrode bars for transmission of the welding current.

17. A welding machine for operation upon a continuously moving work piece, said machine having opposed head and platen members arranged to close and open upon the work which travels between said members to apply clamping pressures of predetermined duration to successive portions of the work, characterized by electrode bars mounted on the adjacent faces of the head and platen members for transverse sliding movement relative thereto in planes parallel to the plane of motion of the work, and yielding means tending to maintain said bars in a normal transverse position, closing movement of said head and platen members serving to clamp the work between said electrodes which are forced to travel with the work for the duration of the clamping pressure and which are restored to normal position when opening motion of the head and platen members releases the clamping pressure.

WILLIAM A. CANNELL.
MAURICE D. WOODRUFF.

REFERENCES CITED

The following references are of record in the file of this patent:

UNITED STATES PATENTS

| Number | Name | Date |
|---|---|---|
| 2,210,056 | Biederman | Aug. 6, 1940 |
| 2,234,232 | Chambers | Mar. 11, 1941 |